(12) United States Patent
Harper et al.

(10) Patent No.: US 8,734,554 B2
(45) Date of Patent: May 27, 2014

(54) FORMED SEAL RING FOR A LIQUID GAS SEPARATING ELEMENT

(75) Inventors: David K. Harper, Concord, NC (US); Daniela Zinic, Speyer (DE); Wolfgang Heikamp, Waldsee (DE)

(73) Assignee: Ingersoll-Rand Company, Piscataway, NJ (US)

( * ) Notice: Subject to any disclaimer, the term of this patent is extended or adjusted under 35 U.S.C. 154(b) by 0 days.

(21) Appl. No.: 13/521,606

(22) PCT Filed: Jan. 14, 2011

(86) PCT No.: PCT/US2011/021244
§ 371 (c)(1),
(2), (4) Date: Jul. 11, 2012

(87) PCT Pub. No.: WO2011/088290
PCT Pub. Date: Jul. 21, 2011

(65) Prior Publication Data
US 2012/0285559 A1    Nov. 15, 2012

Related U.S. Application Data

(60) Provisional application No. 61/295,286, filed on Jan. 15, 2010.

(51) Int. Cl.
*B01D 50/00* (2006.01)

(52) U.S. Cl.
USPC ............ 55/337; 55/436; 55/486; 55/487; 55/498; 55/502; 55/503; 55/510; 55/423; 55/DIG. 17; 96/189; 210/234; 210/232; 210/497.01; 210/DIG. 5

(58) Field of Classification Search
USPC ......... 55/436, 486, 487, 498, 502, 503, 510, 55/423, DIG. 17; 123/198 E, 573, 574; 96/189; 137/544; 210/234, 232, 210/497.01, DIG. 5
See application file for complete search history.

(56) References Cited

U.S. PATENT DOCUMENTS

| 4,260,402 | A | * | 4/1981 | Shaffer et al. | 55/505 |
| 4,968,221 | A | * | 11/1990 | Noll | 417/295 |
| 2004/0098956 | A1 | * | 5/2004 | Care et al. | 55/400 |
| 2005/0241283 | A1 | * | 11/2005 | Fallows et al. | 55/360 |

FOREIGN PATENT DOCUMENTS

| EP | 0063656 A1 | 11/1982 |
| EP | 0391064 A1 | 10/1990 |
| EP | 1344559 A1 | 9/2003 |

OTHER PUBLICATIONS

International Search Report and Written Opinion of PCT/US2011/021244, dated Sep. 28, 2011.

* cited by examiner

*Primary Examiner* — Jason M Greene
*Assistant Examiner* — Dung H Bui
(74) *Attorney, Agent, or Firm* — Michael Best & Friedrich LLP

(57) ABSTRACT

A gas compression system includes a compressor operable to discharge a mixed flow of gas and lubricant, a separator tank including an opening having a first face, and a separator element including a disk portion having a second face and a third face. The separator element is positioned at least partially within the opening and is operable to separate at least a portion of the lubricant from the mixed flow of gas and lubricant. A lid is coupled to the separator tank and includes a fourth face. A one-piece seal ring is coupled to the disk and is compressed between the lid, the disk, and the separator tank to define a first airtight seal between the first face and the second face and a second airtight seal between the third face and the fourth face.

24 Claims, 6 Drawing Sheets

FORMED SEAL RING FOR A LIQUID GAS SEPARATING ELEMENT

BACKGROUND

The present invention relates to seals for separator elements, and more particularly to formed seals for use in air-oil separators.

Some air compressor systems use oil to lubricate the compressor, remove heat produced during the compression process, and to provide better seals between the compressor elements to improve compressor efficiency. One example of such a compressor system employs one or more oil-flooded screw compressors.

Operation of oil-flooded compressors produces compressed air that is mixed with oil. It is necessary to separate the oil from the air before the air can be used. Typically, the oil is separated and returned to the compressor for reuse. In some systems, the oil is filtered, or cooled before it is returned to the compressor.

SUMMARY

In one construction, the invention provides a gas compression system that includes a compressor operable to discharge a mixed flow of gas and lubricant, a separator tank including an opening having a first face, and a separator element including a disk portion having a second face and a third face. The separator element is positioned at least partially within the opening and is operable to separate at least a portion of the lubricant from the mixed flow of gas and lubricant. A lid is coupled to the separator tank and includes a fourth face. A one-piece seal ring is coupled to the disk and is compressed between the lid, the disk, and the separator tank to define a first airtight seal between the first face and the second face and a second airtight seal between the third face and the fourth face.

In another construction, the invention provides a gas compression system that includes a compressor housing including a gas inlet, a lubricant inlet, and an outlet and a compressor element positioned at least partially within the compressor housing and operable to receive a flow of gas from the gas inlet and a flow of lubricant from the lubricant inlet and discharge a mixed flow of gas and lubricant from the outlet. A separator tank includes an opening having a first face and an inlet in fluid communication with the outlet to receive the mixed flow of gas and lubricant. A separator element includes a disk portion having a second face and a third face. The separator element is positioned at least partially within the opening such that the second face is in a facing relationship with the first face. The separator element is operable to separate at least a portion of the lubricant from the mixed flow of gas and lubricant. A lid includes a fourth face. The lid is coupled to the separator tank such that the fourth face is in a facing relationship with the third face. A one-piece seal ring is coupled to the disk and is compressed between the lid, the disk, and the separator tank to define a first airtight seal between the lid and the disk and a second airtight seal between the disk and the separator tank.

In yet another construction, the invention provides a separator element for use in a gas compression system to separate at least a portion of a lubricant from a mixed flow of lubricant and a gas, the separator element configured to be positioned within a separator tank having a lid. The separator element includes a housing, a screen supported by the housing and arranged in a substantially cylindrical shape and including a plurality of apertures, and a filtering material disposed in a hollow cylindrical space within the screen and supported by the housing. A disk portion is formed as part of the housing and a one piece seal member is coupled to the disc portion. The seal member has a U-shaped cross section that defines a first leg portion and a second leg portion. The first leg portion is configured to define an airtight seal between the disk portion and the lid and the second leg portion is configured to define an airtight seal between the disk portion and the separator tank.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
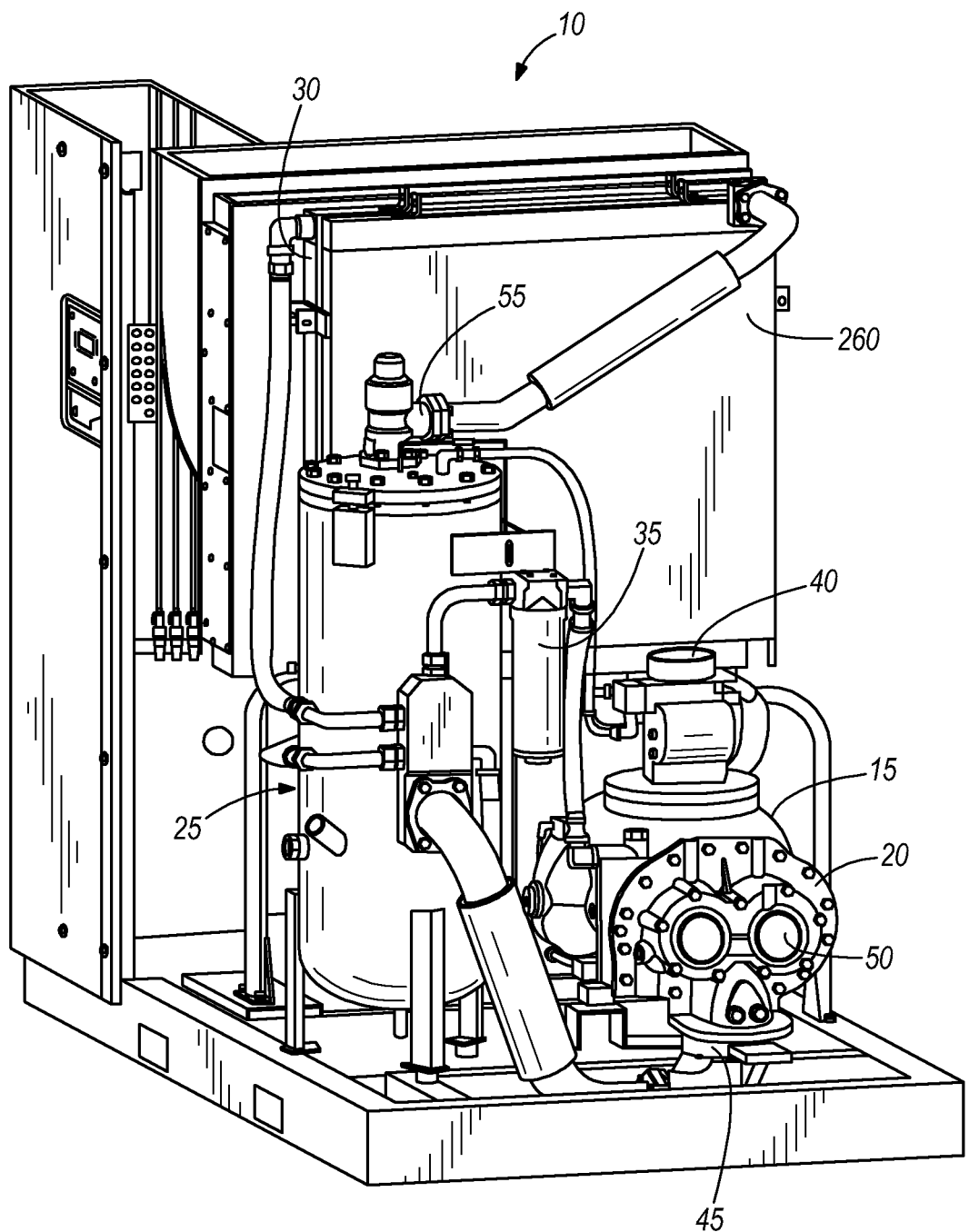
FIG. 1 is a perspective view of a gas compression system including a separator.

FIG. 1 illustrates a gas compression system 10 that operates to compress a gas such as air. The system includes a prime mover 15 that drives a compressor 20, an oil separator 25, a cooler 30, and an oil filter 35. In preferred constructions, a motor or engine is employed as the prime mover 15 with other devices also suitable for use as a prime mover 15.

The compressor 20 draws in air (or another gas) through an inlet 40 that typically includes an air filter and discharges the air from a compressor outlet 45 at a higher pressure. In the illustrated construction, an oil-flooded compressor 20 such as an oil-flooded screw compressor that includes two or more rotating screw elements 50 is employed. Oil is provided to the compressor 20 to improve the seal between the rotating elements 50, to lubricate the rotating elements 50, and to remove heat produced during the compression process. The oil mixes with the air and is discharged as an air-oil mixture from the compressor outlet 45.

The outlet 45 directs the air-oil mixture to the separator 25 where the oil is separated from the air. The air exits the separator 25 via a separator outlet 55 and flows to the cooler 30 and then to a point of use or to other treatment members (e.g., chillers, dryers, filters, etc.). The oil exits the separator 25 and flows through the filter 35 and may flow through an optional oil cooler 30 before being redirected to the compressor 20 for reuse.

While the description describes a compression system 10 for compressing air and a separator 25 that separates air and oil, it should be understood that other gases could be compressed by the compressor 20. For example, in one arrangement, a refrigerant compressor is used to compress a refrigerant. In addition, while oil is used in the described compressor 20, other lubricants could also be employed and will function in the described device. Thus, while the device is described as using air and oil, other fluids could be employed.

Figure 2:
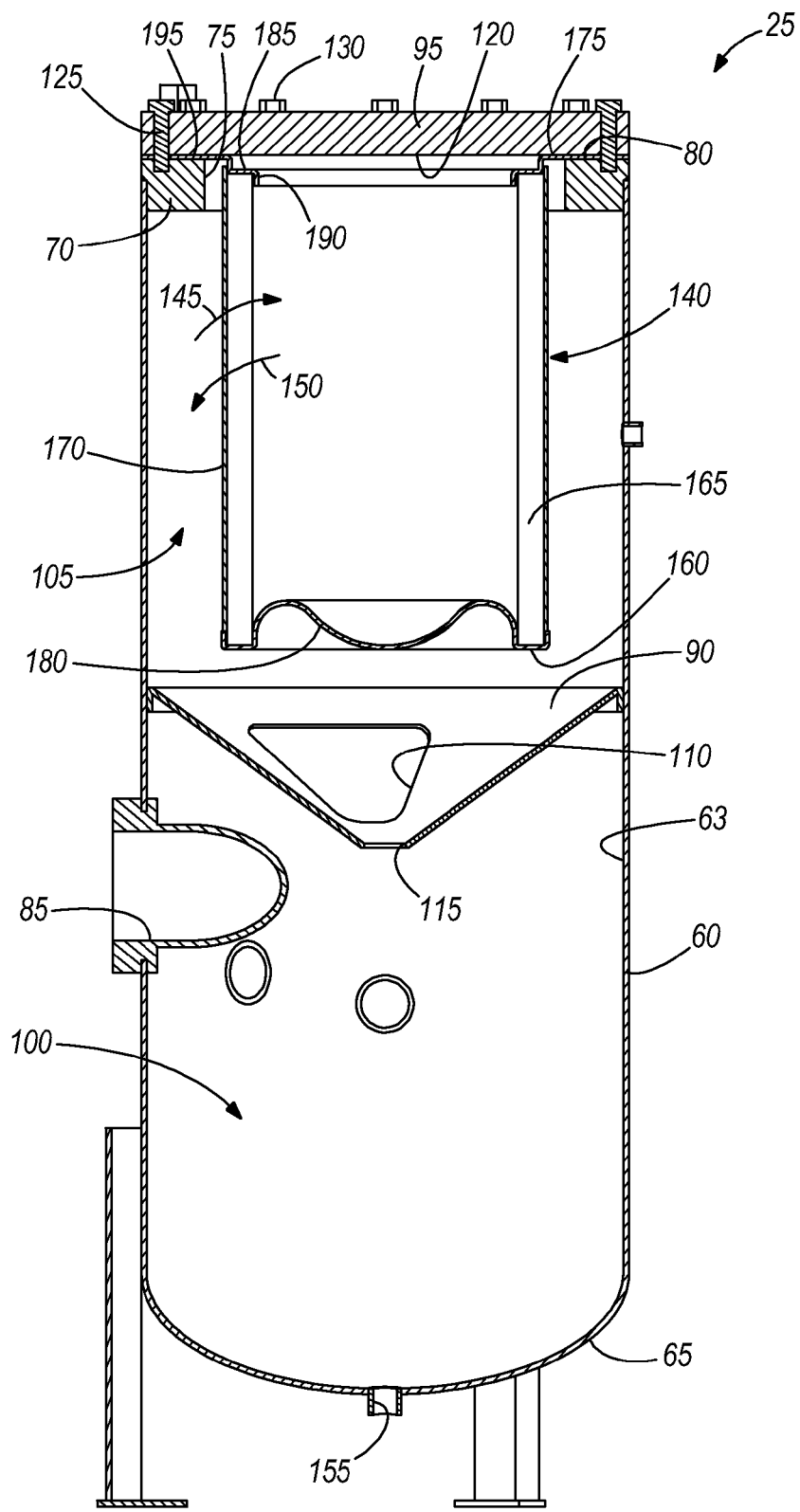
FIG. 2 is a section view of the separator of the gas compression system of FIG. 1.

With reference to FIG. 2, the separator 25 includes a tank 60 that includes a side surface 63 that is generally cylindrical, a domed bottom portion 65, and a flange 70 formed around a top opening 75. The flange 70 includes a top surface 80 or face that is substantially planar. An inlet 85 is formed in the cylindrical side portion 63 of the tank 60 and is arranged to induce a cyclonic flow pattern that aids in the separation of the oil from the air-oil mixture as will be described.

The separator 25 also includes a funnel member 90 and a lid 95 that selectively engages the flange 70 to enclose and substantially seal the interior of the tank 60. The funnel member 90 is fixedly attached to the interior of the tank 60 to divide the tank 60 into a lower portion 100 and an upper portion 105. The funnel member 90 is frustoconical with a small diameter portion facing downward. The air-oil inlet 85 is positioned in the lower portion 100 such that the air-oil mixture is admitted into the tank 60 beneath the funnel member 90. The funnel member 90 includes one or more apertures 110 that allow the air-oil mixture to flow upward from the lower portion 100 to the upper portion 105. The funnel member 90 also includes a central aperture 115 at the lower most point that provides a flow path for oil to pass from the upper portion 105 to the lower portion 100 where it collects in the domed portion 65. It should be noted that the means employed to separate the oil and the air is not critical to the function of the invention as the invention is applicable to many different single stage and multi-stage separator arrangements.

The lid 95 includes a bottom surface 120 or face that is substantially planar, an outlet aperture formed near the center of the lid 95 and a plurality of bolt apertures 125 positioned on the circumference of a bolt circle. Bolts 130 pass through each aperture 125 and engage the flange 70 of the tank 60 to attach the lid 95 to the tank 60 such that a bottom surface 120 of the lid 95 is in a facing relationship with the top surface 80 of the flange 70. A separator element 140 sealingly engages the lid 95 and the flange 70 to separate the upper space 105 into a filtered space 145 and an unfiltered space 150. The air-oil mixture must pass from the unfiltered space 150, through the separator element 140 to the filtered space 145 in order to exit the separator 25. The separator element 140 operates to separate a desired portion of the oil from the air-oil mixture such that the fluid that exits via the outlet 55 is substantially oil free air. The separated oil eventually drains from the separator element 140, onto the funnel 90 and down to the domed portion 65 of the tank 60. A drain 155 is provided on the bottom of the tank 60 to draw the oil back into the system 10 for reuse or for other uses as may be desired.

Figure 3:
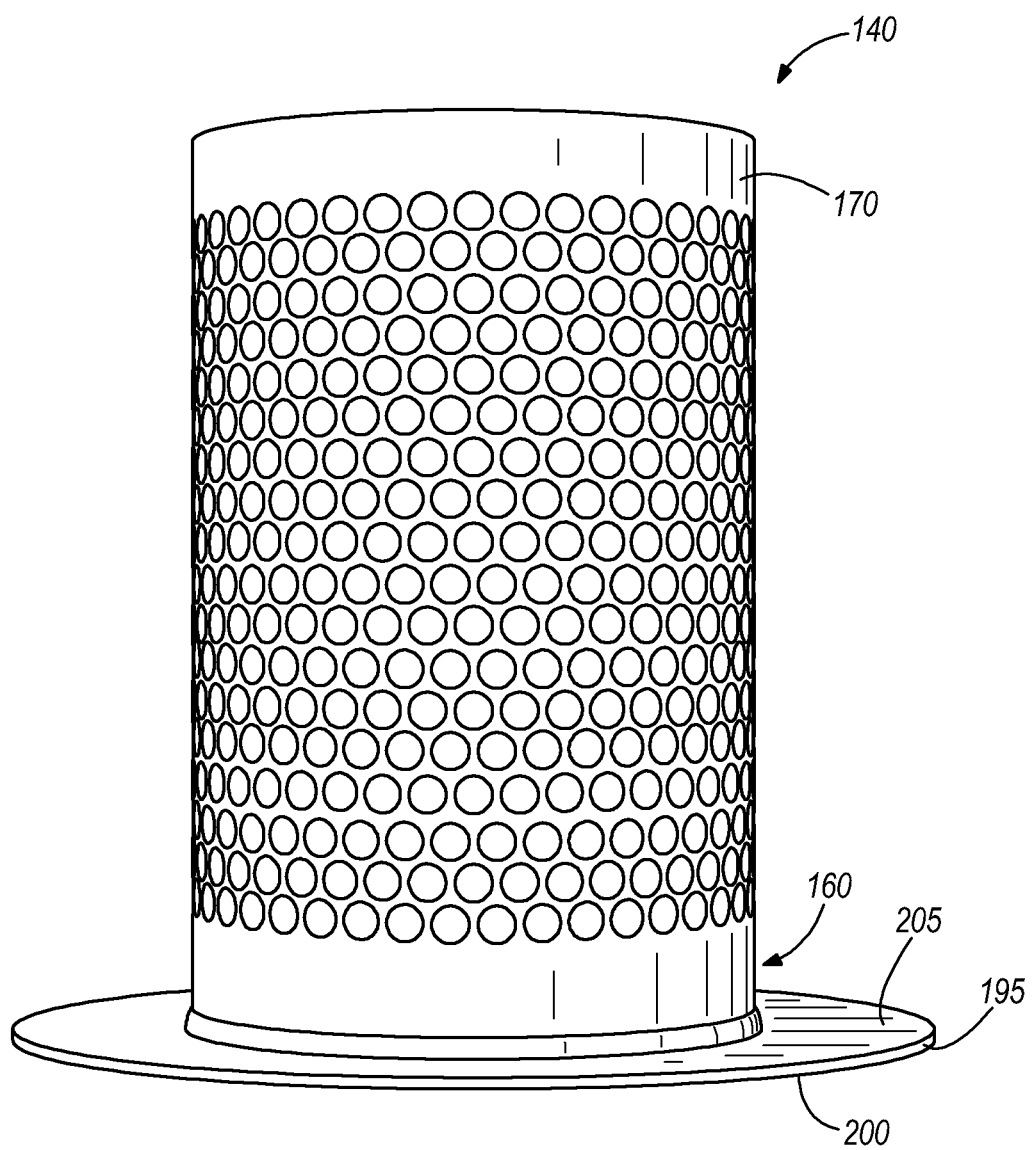
FIG. 3 is a perspective view of a separator element suitable for use in the separator of FIG. 2.

With reference to FIGS. 2 and 3, the separator element 140 includes a housing 160 that supports a filter material 165. In the illustrated construction, the housing 160 includes a cylindrical side surface 170, a top 175, and a bottom 180. The cylindrical side surface 170 is perforated to provide for flow through the element 140. In some constructions, the housing 160 provides a frame work and a screen is attached to that frame work to define the cylindrical side surface 170. The filter material 165 is supported adjacent the cylindrical surface 170 and is configured to separate oil from air as the air-oil mixture flows through the material 165.

The bottom 180 of the housing 160 supports the filter material 165 and sealingly engages the side surface 170 to assure that little or no flow passes through the bottom 180 or bypasses the filter material 165 via the bottom 180. In preferred constructions, the bottom 180 is fixedly attached to or formed as part of the side surface 170. However, in some constructions, the bottom 180 is a separate piece positioned adjacent the side surface 170. In the illustrated construction, the bottom 180 is not planar and is formed to direct oil that may collect on the bottom 180 toward the center of the bottom 180 or toward the outer diameter of the bottom 180. In some constructions, a small aperture is formed in the center of the bottom 180 to drain any oil that might collect during operation. The bottom 180 also cooperates with the side surface 170 to sandwich a portion of the filter material 165 to inhibit movement of the filter material 165 inward during operation.

The top 175 includes a cover portion 185, an inner lip 190, and a disk 195. In preferred constructions, the top 175 is fixedly attached to or formed as part of the side surface 170. However, in some constructions, the top 175 is a separate piece positioned adjacent the side surface 170. The cover portion 185 is substantially planar and is positioned above the filter material 165. The inner lip 190 extends downward from the cover portion 185 and cooperates with the side surface 170 to sandwich a portion of the filter material 165 to inhibit movement of the filter material 165 inward during operation. The disk 195 is a substantially planar annular portion that includes a top surface 200 or face and a bottom surface 205 or face that define a thickness. The top surface 200 and bottom surface 205 extend radially outward to a predetermined outer diameter. The disk 195 is sized to fit between the flange 70 and the lid 95 such that when the lid 95 is bolted to the flange 70, the disk 195 is sandwiched therebetween to support the separator element 140 as illustrated in FIG. 2.

Figure 6:
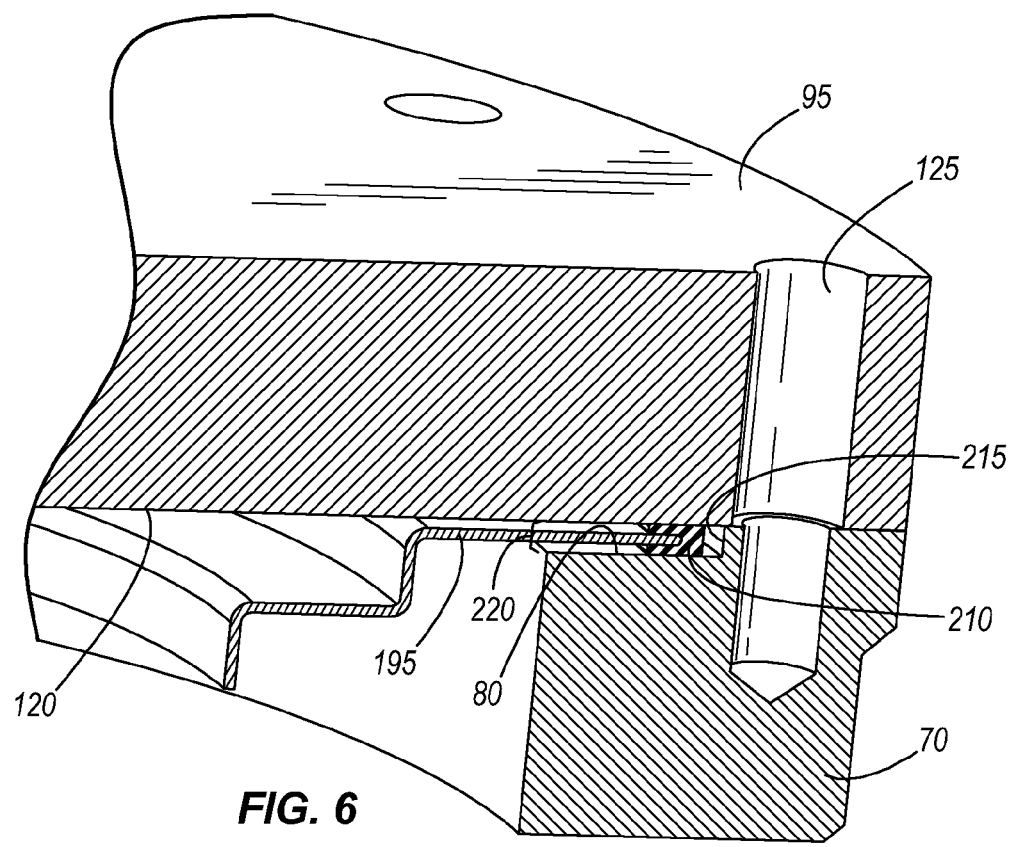
FIG. 6 is a section view of a portion of the separator of FIG. 2 illustrating the seal ring.
Figure 7:
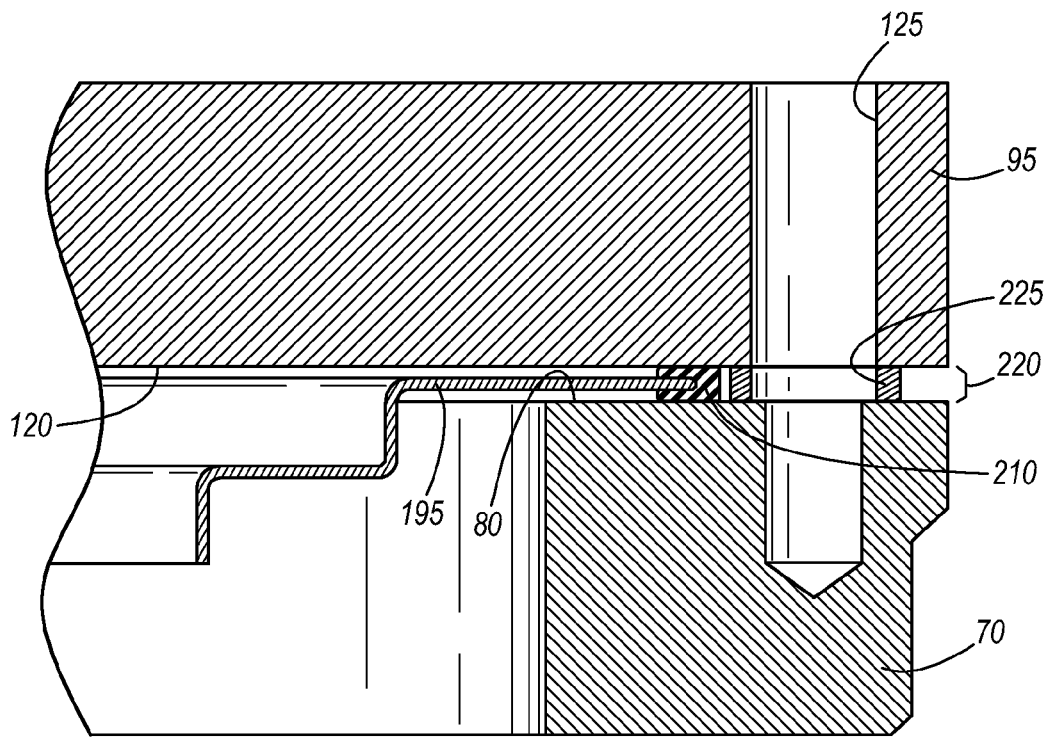
FIG. 7 is a section view of a portion of another separator suitable for use in the gas compression system of FIG. 1 illustrating the seal ring.

As illustrated in FIGS. 6 and 7, a seal ring 210 is positioned around a portion of the disk 195 at the outer diameter. The seal ring 210 is sandwiched between the lid 95 and the flange 70 to improve the seal between these components. In the construction illustrated in FIG. 6, the flange 70 includes a step 215, or counterbore, that results in a gap 220 between the flange 70 and the lid 95 when the lid 95 is attached to the flange 70. The gap 220 is sized to provide the desired compression or preload of the seal ring 210 as will be discussed below. It should be understood that other constructions may form the step in the lid 95 or may be formed in both the lid 95 and the flange 70 to provide the desired gap 220.

FIG. 7 illustrates another arrangement in which the flange 70 and the lid 95 include flat parallel surfaces and a spacer 225 is positioned therebetween to define the desired gap 220. In this construction, the spacer 225 is sized to produce a gap 220 of the desired size to provide the desired compression or preload of the seal ring 210. Other arrangements could also be employed to establish the desired gap 220 without effecting operation of the seal ring 210.

Figure 4:
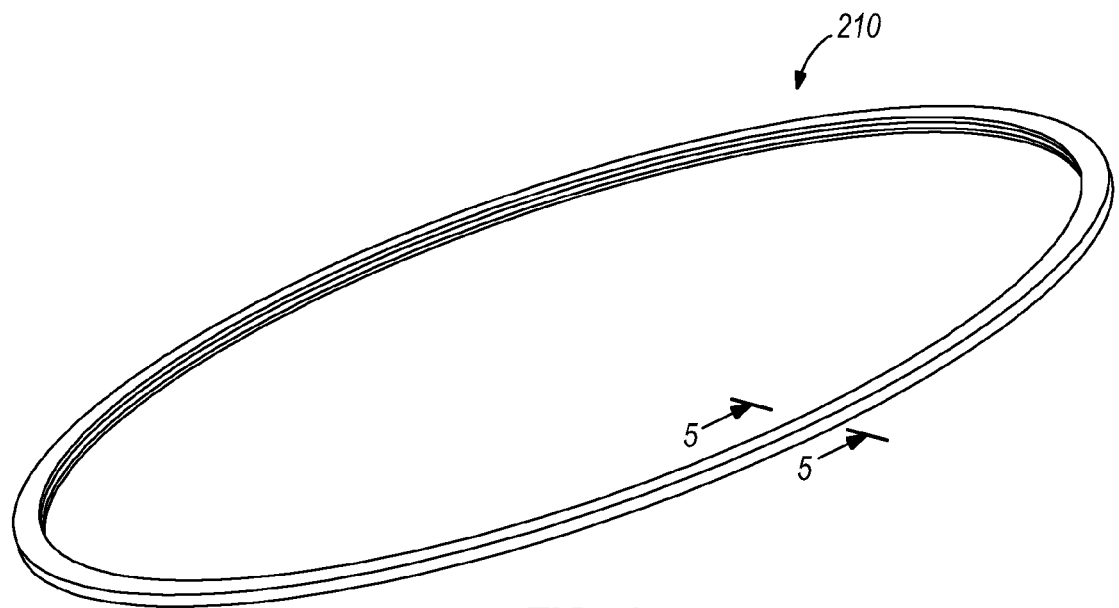
FIG. 4 is a perspective view of a seal ring suitable for use with the separator of FIG. 2.

As illustrated in FIG. 4, the seal ring 210 is a continuous ring that is formed from a resilient material. The resilient material allows the ring 210 to stretch over the disk 195 for installation and allows the seal ring 210 to compress or deform slightly in response to pressure forces and during assembly.

Figure 5:
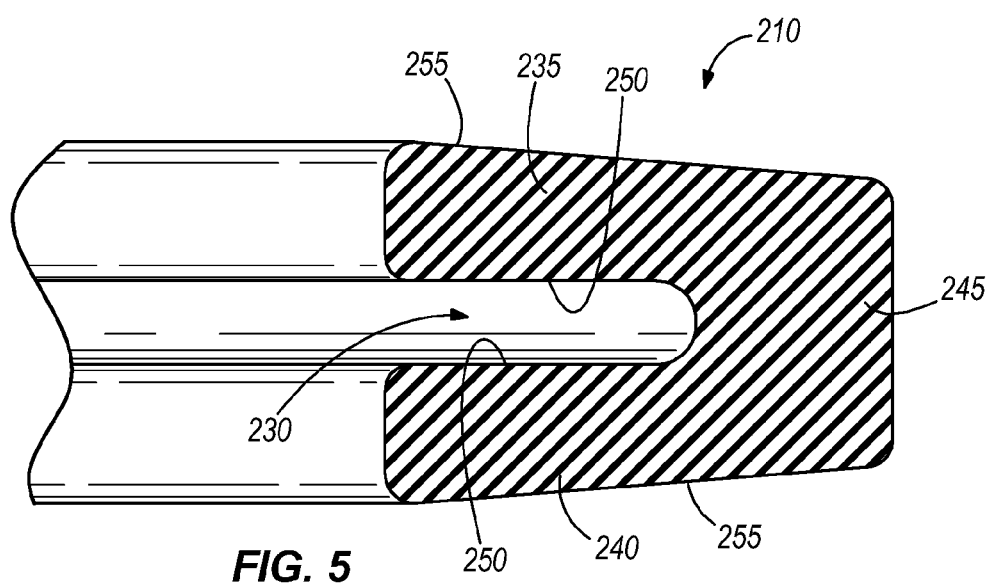
FIG. 5 is a section view of the seal ring of FIG. 4 taken along line 5-5 of FIG. 4.

With reference to FIG. 5, the seal ring 210 includes an inner space 230, a first leg 235, a second leg 240, and an outer portion 245. The inner space 230 is sized to receive a portion of the disk 195 without having to deform significantly. In preferred constructions, the inner space 230 defines a width that is about equal to the thickness of the disk 195. In the illustrated construction, the inner space 230 is U-shaped and includes a semi-circular or curved bottom. However, other constructions may include flat bottoms or other shapes as desired.

The first leg 235 and the second leg 240 extend from the outer portion 245 and cooperate to define the inner space 230. Each of the first leg 235 and the second leg 240 includes a substantially planar inner surface 250 that defines one side of the inner space 230 and a frustoconical outer surface 255 or face that extends from the innermost diameter to the outer diameter. In the illustrated constructions, the frustoconical surfaces 255 taper from a first width to a second smaller width in a substantially uniform and consistent fashion. In other constructions, the taper or slope of the surface 255 may vary, there may be a planar portion, or the taper could be reversed as may be required for the particular application.

When assembled onto the disk 195, the planar inner surfaces 250 are parallel to and in contact with the top surface 200 and bottom surface 205 of the disk 195. Because the seal ring 210 does not need to deform to receive the disk 195, the inner surfaces 250 and the top surface 200 and the bottom surface 205 make very good contact along a significant portion of their length, thereby improving the seal therebetween.

The outer surface 255 of the first leg 235 is in a facing relationship with and contacts the bottom surface 120 of the lid 95 and the outer surface 255 of the second leg 240 is in a facing relationship with and contacts the top surface 80 of the flange 70 during assembly. Because of the taper of the outer surfaces 255, the first leg 235 and the second leg 240 contact first near the inner diameter. As the bolts 130 are tightened, the compressive force increases, thereby compressing and displacing the first leg 235 and the second leg 240. As the first leg 235 and the second leg 240 displace, additional contact is made between the first leg 235 and the lid 95 and between the second leg 240 and the flange 70. Thus, after assembly, the first leg 235 and the second leg 240 are most highly compressed near the inside diameter and are less compressed further toward the outside diameter.

To assemble the separator 25, the user places the seal ring 210 around the disk 195 of the separator element 140 and then positions the separator element 140 within the tank 60 with the second leg 240 of the seal ring 210 resting on the top surface 80 of the flange 70. In constructions such as the one illustrated in FIG. 7, the user next positions the spacer or spacers 225 on the flange 70. The lid 95 is then positioned above the flange 70 such that the bottom surface 120 of the lid 95 contacts the second leg 240 of the seal ring 210. The bolts 130 are tightened to compress the seal ring 210 and provide a seal between the seal ring 210 and the lid 95, the seal ring 210 and the top surface 200 of the disk 195, the seal ring 210 and the bottom surface 205 of the disk 195, and the seal ring 210 and the flange 70. Thus, the use of the seal ring 210 provides four separate seals using only a single resilient seal ring 210.

Figure 8:
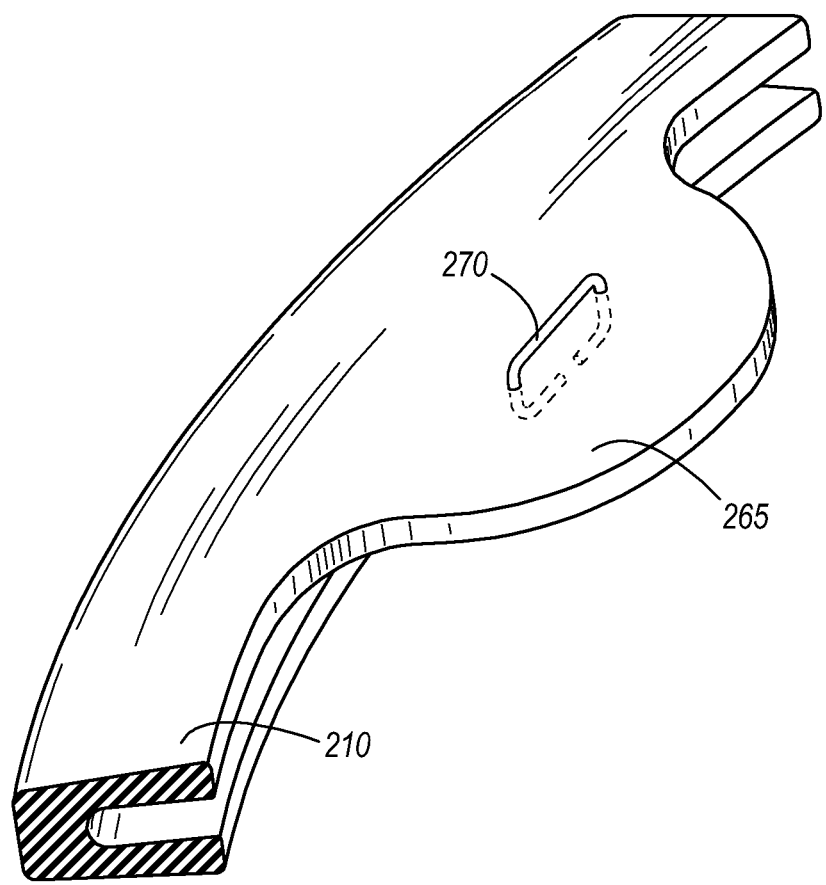
FIG. 8 is a perspective view of a portion of the seal ring including a metallic grounding element.

Once assembled, the seal ring 210 electrically isolates the separator element 140 from the tank 60 and the lid 95. With reference to FIG. 8, some constructions of the seal ring 210 include a tab portion 265 and a metallic grounding element 270 that passes through the tab portion 265. The metallic grounding element 270 can include a staple that passes through the tab portion 265. The metallic grounding element 270 contacts the disk 195 of the separator element 140 and also contacts the lid 95 to provide an electrical connection therebetween. The electrical connection assures that during operation, the separator element 140 is electrically grounded and no static charge can build up in the separator element 140. Such a charge, if it were able to build-up could cause an undesirable spark. It should be noted, some constructions place the tab 265 band metallic grounding element 270 on the flange side of the separator element 140 such that the metallic grounding element 270 provides direct electrical contact between the tank 60 and the separator element 140. The tank 60 and the lid 95 are electrically connected via the bolts.

In operation, the prime mover 15 operates to rotate the screw elements 50 within the compressor housing. Rotation of the screw elements 50 draws in atmospheric air and compresses that air. A flow of oil is directed to the screw elements 50 to improve the seal between the elements 50, to lubricate the screw elements 50, and to remove heat produced during compression. The compressed air and oil forms an air-oil mixture that exits the compressor 20 via the compressor outlet 45 and flows to the separator inlet 85. The air-oil mixture enters the separator 25 through an opening that is preferably off center, angled with respect to a radial line in the cylindrical tank 60, and/or directed in a slight downward or upward angle. Using this arrangement produces a swirl of the inlet air-oil to establish a cyclonic flow. The cyclonic flow forces heavier particles, such as entrained oil, outward until the oil contacts the side surface of the tank 60 and separates from the air-oil mixture. Eventually, the air-oil mixture flows upward through the funnel member 90 and into the unfiltered portion 150 of the upper space 105. The air-oil mixture then flows through the separator element 140 which operates to separate additional oil from the air-oil mixture. The air then exits the separator 25 via the outlet 55 which is in fluid communication with the filtered space 145. In preferred constructions, the separator element 140 is arranged to separate enough oil from the air to deem the exiting air oil free (i.e., fewer than 10 parts per million by mass).

The separated oil flows downward along the sides of the tank 60 to the bottom of the tank 60. Additional separated oil drains from the separator element 140, collects in the funnel 90 and eventually drains to the bottom of the tank 60 where it is removed and circulated back to the compressor 20. In preferred constructions, the oil passes through an optional oil cooler 30 and a filter 35 before it is returned to the compressor 20. Similarly, the now oil free air passes through a cooler 260, a dryer, or other air treatment components before it is directed to a point of use.

High pressure air from the filtered space 145 and the unfiltered space 150 abuts the first leg 235 and the second leg 240 respectively. The pressure applies a radial force to each of the legs 235, 240, which operate to displace the legs 235, 240 radially outward. However, the pressure also displaces the legs 235, 240 in directions normal to the pressure force, thereby enhancing the contact pressure and seals produced by the seal ring 210.

Thus, the invention provides, among other things, a sealing system for a separator element 140 disposed in a tank 60. Various features and advantages of the invention are set forth in the following claims.

What is claimed is:

1. A gas compression system comprising:
a compressor operable to discharge a mixed flow of gas and lubricant;
a separator tank including an opening having a first face;
a separator element including a disk portion having a second face and a third face, the separator element positioned at least partially within the opening and operable to separate at least a portion of the lubricant from the mixed flow of gas and lubricant;
a lid coupled to the separator tank and including a fourth face; and a one-piece seal ring coupled to the disk portion and compressed between the lid, the disk, and the separator tank to define a first airtight seal between the first face and the second face and a second airtight seal between the third face and the fourth face.

2. The gas compression system of claim 1, wherein the compressor includes a rotary screw compressor.

3. The gas compression system of claim 1, wherein the second face is in a facing relationship with the first face and is spaced apart from the first face.

4. The gas compression system of claim 1, wherein the fourth face is in a facing relationship with the third face and is spaced apart from the first face.

5. The gas compression system of claim 1, wherein the separator element includes a coalescing filter.

6. The gas compression system of claim 1, wherein the seal ring is formed from an elastomeric material.

7. The gas compression system of claim 1, wherein the seal ring has a U-shaped cross section that defines a first leg that defines the first airtight seal and a second leg that defines the second airtight seal.

8. The gas compression system of claim 7, wherein the U-shaped cross section defines a gap between the first leg and the second leg, the gap sized to closely fit the disk portion.

9. The gas compression system of claim 7, wherein the first leg includes an outer most surface that is frustoconical and the second leg includes an outer most surface that is frustoconical.

10. The gas compression system of claim 9, wherein the seal ring has an outer diameter surface and an inner diameter surface, and wherein the seal ring has a first thickness measured at the outer diameter surface and a second thickness measured at the inner diameter surface, the second thickness being greater than the first thickness.

11. A gas compression system comprising:
a compressor housing including a gas inlet, a lubricant inlet, and an outlet;
a compressor element positioned at least partially within the compressor housing and operable to receive a flow of gas from the gas inlet and a flow of lubricant from the lubricant inlet and discharge a mixed flow of gas and lubricant from the outlet;
a separator tank including an opening having a first face and an inlet in fluid communication with the outlet to receive the mixed flow of gas and lubricant;
a separator element including a disk portion having a second face and a third face, the separator element positioned at least partially within the opening such that the second face is in a facing relationship with the first face, the separator element operable to separate at least a portion of the lubricant from the mixed flow of gas and lubricant;
a lid including a fourth face, the lid coupled to the separator tank such that the fourth face is in a facing relationship with the third face; and
a one-piece seal ring coupled to the disk portion and compressed between the lid, the disk portion, and the separator tank to define a first airtight seal between the lid and the disk portion and a second airtight seal between the disk portion and the separator tank.

12. The gas compression system of claim 11, wherein the compressor element includes a rotary screw compressor.

13. The gas compression system of claim 11, wherein the separator element includes a coalescing filter.

14. The gas compression system of claim 11, wherein the seal ring is formed from an elastomeric material.

15. The gas compression system of claim 11, wherein the seal ring has a U-shaped cross section that defines a first leg that defines the first airtight seal and a second leg that defines the second airtight seal.

16. The gas compression system of claim 15, wherein the first leg is compressed between the first face and the second face to define the first airtight seal and the second leg is compressed between the third face and the fourth face to define the second airtight seal.

17. The gas compression system of claim 15, wherein the U-shaped cross section defines a gap between the first leg and the second leg, the gap sized to closely fit the disk portion.

18. The gas compression system of claim 15, wherein the first leg includes an outer most surface that is frustoconical and the second leg includes an outer most surface that is frustoconical.

19. The gas compression system of claim 18, wherein the seal ring has an outer diameter surface and an inner diameter surface, and wherein the seal ring has a first thickness measured at the outer diameter surface and a second thickness measured at the inner diameter surface, the second thickness being greater than the first thickness.

20. A separator element for use in a gas compression system to separate at least a portion of a lubricant from a mixed flow of lubricant and a gas, the separator element configured to be positioned within a separator tank having a lid, the separator element comprising:
a housing;
a screen supported by the housing and arranged in a substantially cylindrical shape, the screen including a plurality of apertures;
a filtering material disposed in a hollow cylindrical space within the screen and supported by the housing;
a disk portion formed as part of the housing;
a one piece seal member coupled to the disk portion, the seal member having a U-shaped cross section that defines a first leg portion and a second leg portion, the first leg portion configured to define an airtight seal between the disk portion and the lid and the second leg portion configured to define an airtight seal between the disk portion and the separator tank.

21. The gas compression system of claim 20, wherein the U-shaped cross section defines a gap between the first leg portion and the second leg portion, the gap sized to closely fit the disk portion.

22. The gas compression system of claim 20, wherein the first leg portion includes an outer most surface that is frustoconical and the second leg portion includes an outer most surface that is frustoconical.

23. The gas compression system of claim 22, wherein the seal member has an outer diameter surface and an inner diameter surface, and wherein the seal member has a first thickness measured at the outer diameter surface and a second thickness measured at the inner diameter surface, the second thickness being greater than the first thickness.

24. The gas compression system of claim 20, wherein the seal member is formed from an elastomeric material.

* * * * *